United States Patent [19]
Velimvassakis et al.

[11] Patent Number: 6,065,805
[45] Date of Patent: May 23, 2000

[54] VEHICLE SEAT

[75] Inventors: Petros Velimvassakis, Karlsruhe; Christian Wobst, Horb, both of Germany

[73] Assignee: DaimlerChrysler AG, Stuttgart, Germany

[21] Appl. No.: 09/407,941

[22] Filed: Sep. 29, 1999

[30] Foreign Application Priority Data

Sep. 29, 1998 [DE] Germany .......................... 198 44 524

[51] Int. Cl.⁷ ...................................................... A47C 1/02
[52] U.S. Cl. .................................. 297/344.11; 296/65.03; 296/65.13
[58] Field of Search ............................. 296/65.01, 65.03, 296/65.13; 297/344.1, 344.11, 452.55, 452.48, 452.99, 452.52, 440.1, 440.22; 248/423

[56] References Cited

FOREIGN PATENT DOCUMENTS 41 40 798 A1  6/1993  Germany .
195 24 174 C1  6/1996  Germany .

*Primary Examiner*—B. Dayoan
*Assistant Examiner*—Mickki D. Murray
*Attorney, Agent, or Firm*—Evenson, McKeown, Edwards & Lenahan, P.L.L.C.

[57] ABSTRACT

A vehicle seat has a seat framework, which includes a cushion support, which receives a seat cushion, and rear and front connections, each designed in pairs, between the cushion support and seat framework. In order to provide a connection between the seat framework and cushion support which is cost-effective to produce and which has sufficient stability with respect to release even in extreme situations, each rear connection has a horizontal guide bolt, which projects transversely on the seat framework, and a U-shaped longitudinal guide, which is fastened on the cushion support and grips over the bolt. Each front connection has a hairpin-like spring, which is secured on the cushion support, and two latching jaws, which are spaced apart transversely from one another on the seat framework. Each latching jaw bears a groove for the form-fitting insertion of one leg of the spring, which spreads in the direction of the latching jaws.

20 Claims, 4 Drawing Sheets

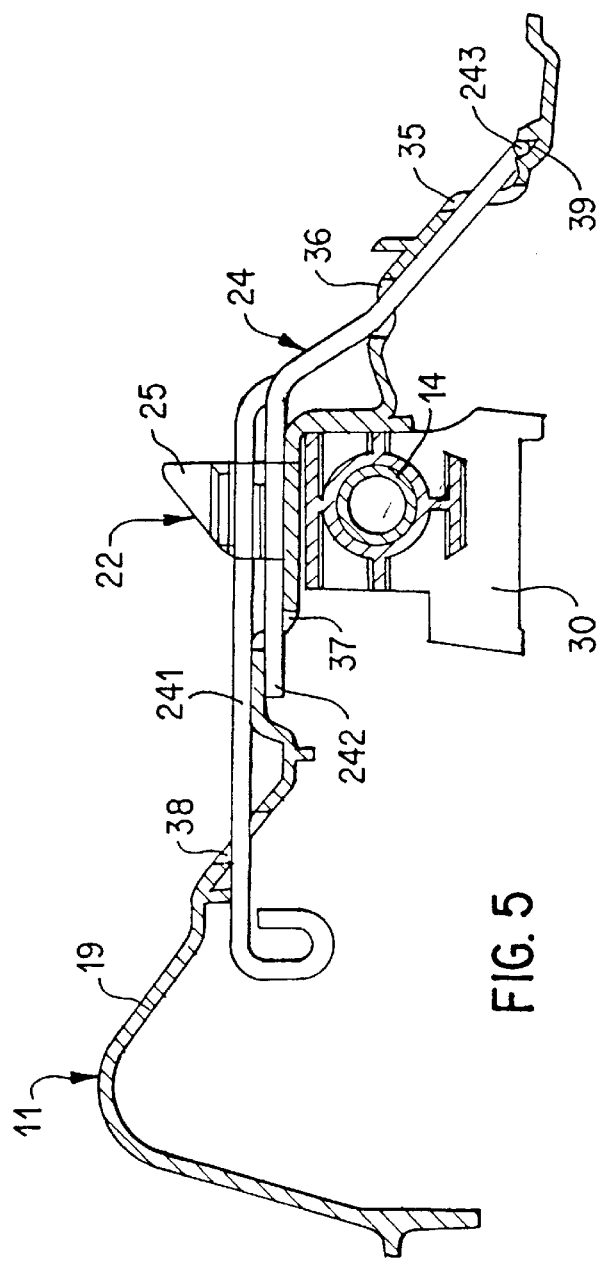
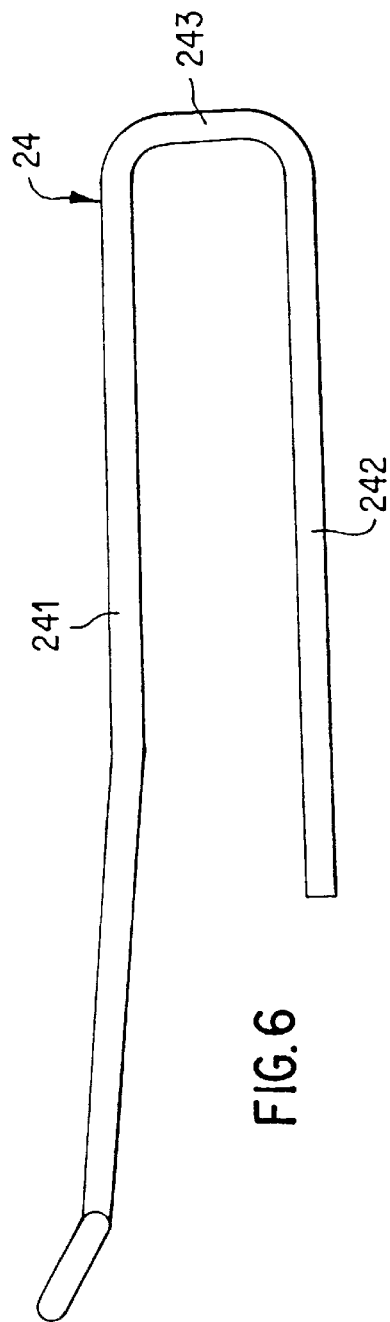

VEHICLE SEAT

BACKGROUND AND SUMMARY OF THE INVENTION

This application claims the priority of German application 198 44 524.5–16, filed Sep. 29, 1998, the disclosure of which is expressly incorporated by reference herein.

The present invention relates to a vehicle seat having a longitudinally displaceable seat framework with a cushion support which receives a seat cushion. The seat has rear and front connections, designed in pairs, between the cushion support and seat framework for securing the cushion support on the seat framework.

In one known vehicle seat of this type (DE 41 40 798 A1), the front connection between the cushion support and seat framework is designed as a clip connection, which comprises a tube section, which is connected to the front crossmember of the seat framework, and a clamp-like clip element, which is integrally formed on the underside of the cushion support, formed as a seat shell, and which grips around more than half the circumference of the tube section. The rear connection between the cushion support and the seat framework has a spring element which is fastened, on the one hand, on a vertical connecting roll, formed integrally on the seat shell, and, on the other hand, on a connecting side plate which projects vertically upwards and is integrally formed on the top rail of the seat framework. The spring element comprises a rubber body with two plates vulcanized thereon. In this case, one plate is fitted, by way of a slot which is open at the bottom, into a headed bolt retained in the connecting wall, and the other plate is positioned, by way of a groove which is open at the bottom, on the top border of the connecting side plate. For securing purposes, a protrusion which is supported by the plate, beneath the groove, engages in a through-passage of the connecting side plate and thus prevents later displacement of the plate and connecting side plate relative to one another in the vertical direction. In such a vehicle seat, the front connection between the seat framework and cushion support is not sufficiently stable with respect to unintentional release. As a result, in the event of a crash, rupturing of the connection cannot be reliably ruled out.

In a known vehicle seat which is fastened on the vehicle floor such that it can be swung up about a front, transversely running pivot axis (DE 195 24 174 C1), a U-shaped, equal-sided spring clasp, with spring prestressing which moves the two spring legs towards one another, is secured on the cushion support, which is designed as a cushion shell, for the purpose of producing quickly relatable locking of the seat on the vehicle floor, which is stable even in the event of a crash. The two spring legs grip behind diametrically opposite sides of a mushroom head shaped projection which is fastened on the vehicle floor.

The object of this invention, in a vehicle seat of the type mentioned above, is to provide, between the seat framework and cushion support, a connection which is cost-effective to produce, requires just a short amount of time to fit and has sufficient stability with respect to release even in extreme situations.

This object is achieved according to the invention by a rear connection which has a horizontal bolt, which projects transversely on the seat framework, and a U-shaped longitudinal guide, which is fastened on a cushion support and grips over the guide bolt, from the end side of the latter, by way of its U-legs. The front connection includes a hairpin-like spring, which is secured on the cushion support, and two latching jaws, which are spaced apart transversely from one another on the seat framework. Each of the jaws has one of two mutually facing grooves for form-fitting insertion of a spring leg of the spring which spreads in the direction of the latching jaws.

The vehicle seat according to the invention has the advantage of providing an extremely straightforward and time-saving operation for fitting the padded cushion support on the seat framework. This operation also lends itself very well to being carried out on an assembly line. The cushion support, with full padding, is pushed onto the two guide jaws on the seat framework by way of its two longitudinal guides and is then pressed down in order to be clipped into the latching jaws of the seat framework, the two springs latching automatically into the latching jaws. Clipping by way of a form-fit and force-fit in each case provides, on the one hand, a reliable connection which does not release if the cushion support is subjected to the action of force and also suppresses any play in the connection between the cushion support and seat framework. As a result, rattling noises cannot occur. The two hairpin-like springs are cost-effective to produce, and their mounts on the cushion support are integrally formed during the production of the cushion support, which means that there are no additional production costs, in particular if the cushion support is injection moulded from plastic in the form of a cushion shell.

Advantageous embodiments of the vehicle seat according to the invention with expedient configurations and developments of the invention will be apparent from the rest of the patent claims.

BRIEF DESCRIPTION OF THE DRAWINGS

The invention is described in more detail hereinbelow with reference to an exemplary embodiment illustrated in the drawing, in which:

FIG. 5 shows a section along line V—V in FIG. 2, and FIG. 6 shows a plan view of a spring of a front connection between the seat framework and cushion support of the vehicle seat.

DESCRIPTION OF THE PREFERRED EMBODIMENTS

Figure 1:
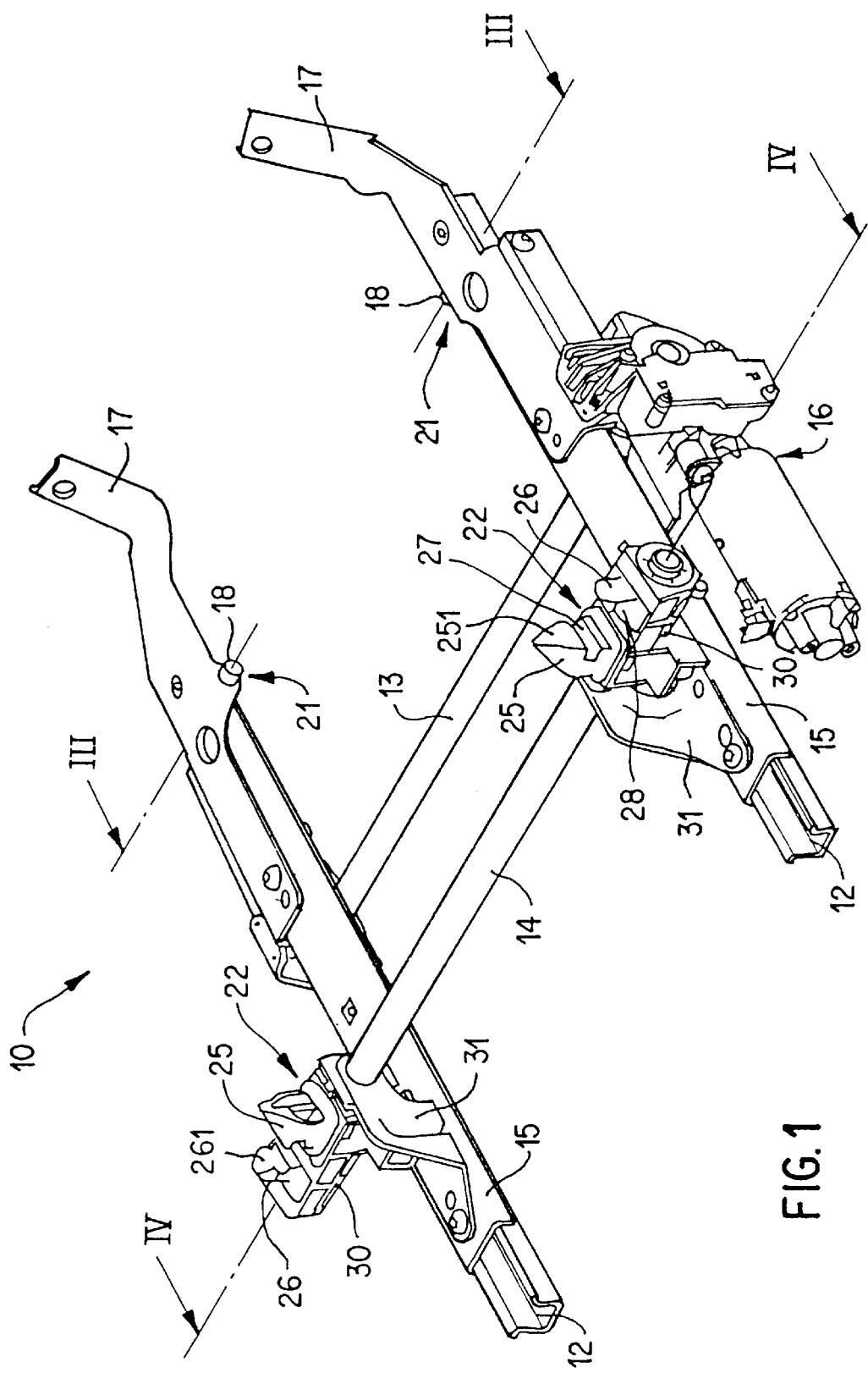
FIG. 1 shows a perspective view of a seat framework of a vehicle seat.

The vehicle seat, which is only partly illustrated, has a seat framework 10 (FIG. 1), which can be displaced longitudinally on the vehicle floor, and a cushion support 11 (FIG. 2), which receives a seat cushion, the seat framework and the cushion support being fixedly connected to one another. The seat framework 10 has a pair of bottom rails 12, which are connected to one another via a crossmember 13 and are secured on the vehicle floor, a pair of top rails 15, which are connected rigidly to one another by a crossmember 14 and of which in each case one is received in a sliding manner on a bottom rail 12, and an electromotive seat adjuster 16, which displaces the top rail 15 on the bottom rails 12 in the longitudinal direction and locks them in any desired position on the bottom rail 12. The seat adjuster 16 is fastened on a bottom rail 12 in the region of the crossmember 13 and grips, by way of a motor-driven drive pinion, in a longitudinal toothing arrangement on the underside of the top rail 15, which is received by the bottom rail 12. An angled bracket 17 is positioned on each top rail 15, and connected rigidly thereto, at the rear end, which is directed away from the crossmember 14. Each bracket 17 is angled upwards at its free end, which is directed away from the top rail 15, in order to receive the cushion support 11 and bears in each case one transversely projecting, horizontally aligned guide bolt 18, which is placed in the region of the end of the top rail 15. The two guide bolts 18 project from mutually facing sides of the two brackets 17, and their axes are aligned with one another.

Figure 2:
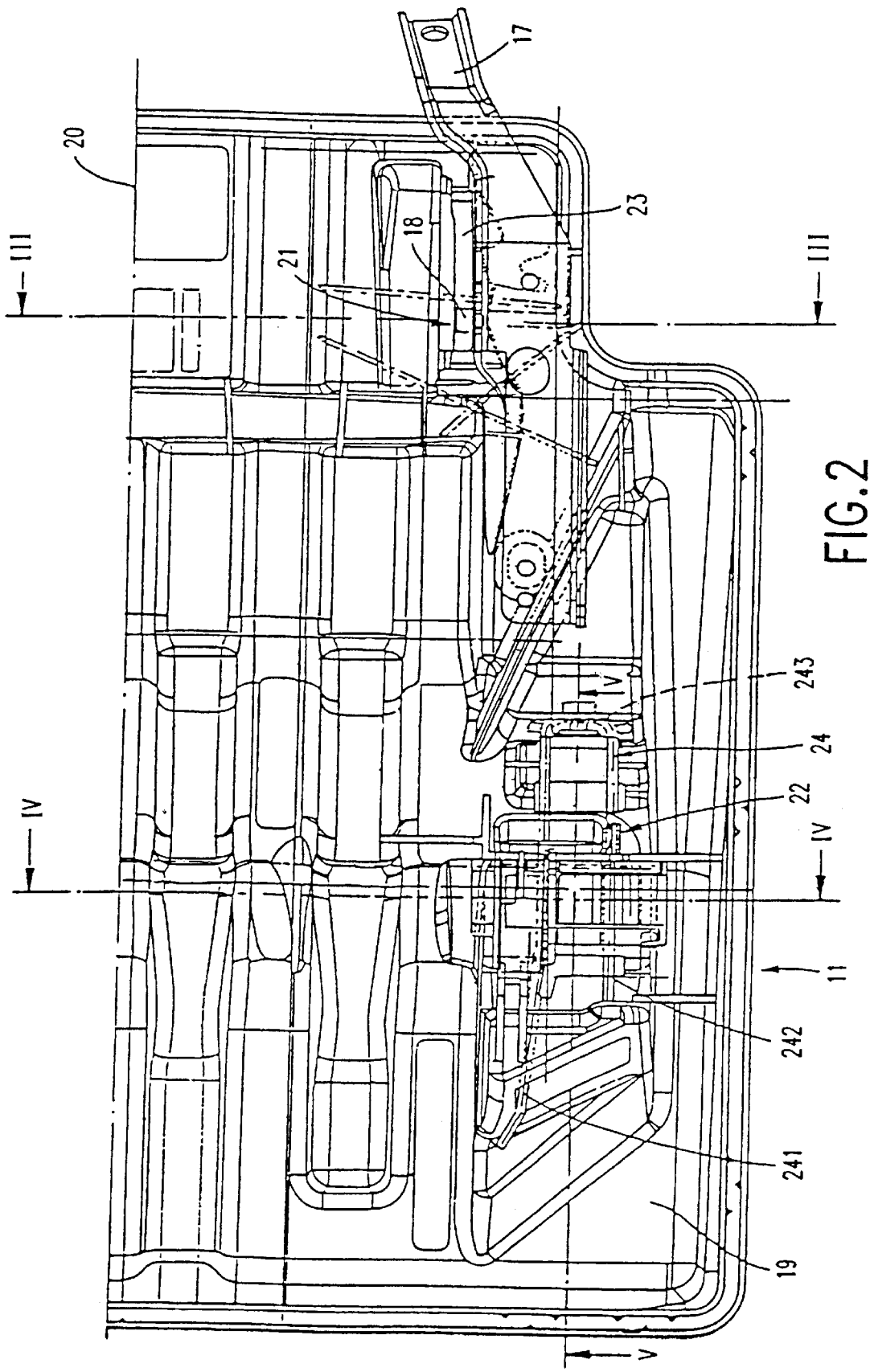
FIG. 2 shows, in detail form, a bottom view of a cushion support, designed as a cushion shell, of the motor-vehicle seat in conjunction with part of the seat framework in FIG. 1.

The cushion support 11 is designed as a cushion shell 19 which is produced from plastic and is illustrated, in detail form, in FIG. 2 in a bottom view in conjunction with a bracket 17 of the seat framework 10. Of the symmetrically shaped cushion shell 19, only one longitudinal half is illustrated in FIG. 2, the axis of symmetry of the cushion shell 19 being designated 20.

Figure 3:
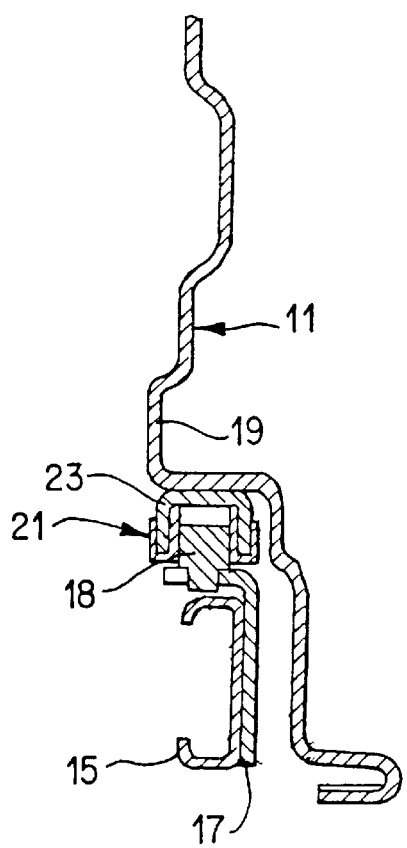
FIG. 3 shows a section along line III—III in FIG. 2 and FIG. 1.
Figure 4:
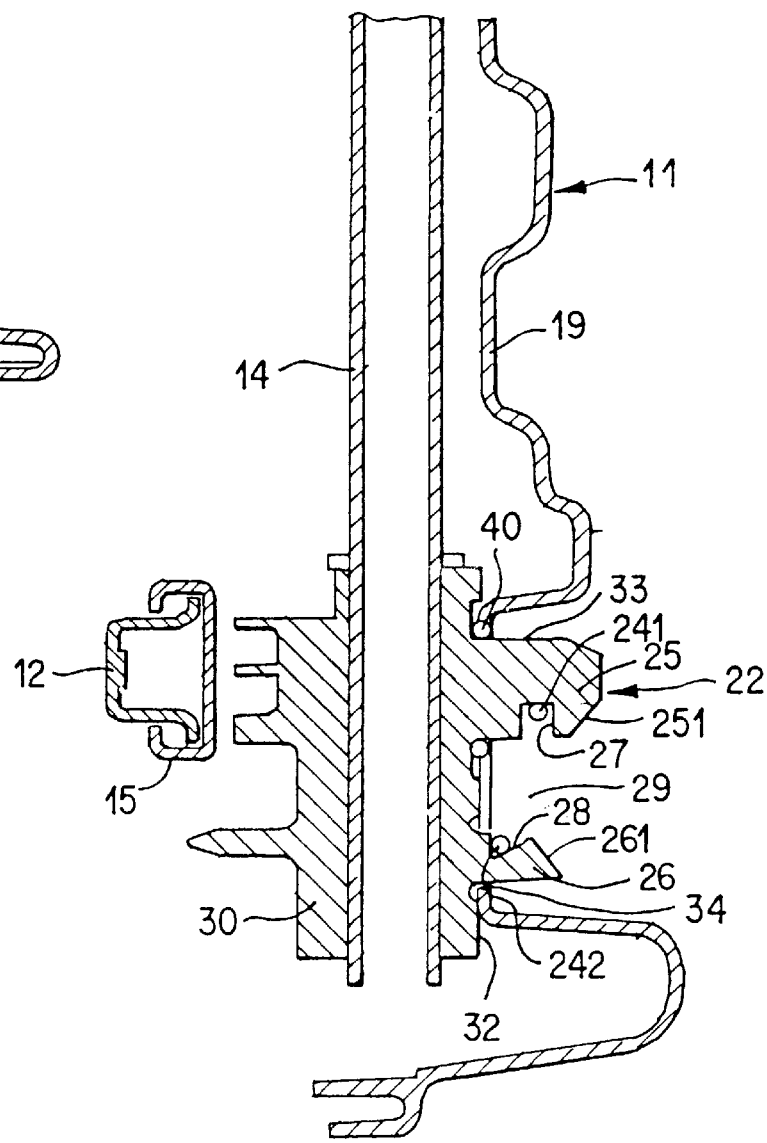
FIG. 4 shows a section along line IV—IV in FIG. 2 and in FIG. 1.

In order to secure the cushion support 11 on the seat framework 10, a rear and front connection, each designed in pairs, is provided between the cushion support 11 and seat framework 10, it being possible for this connection to be produced quickly and straightforwardly. Each connection 21 of the rear connection pair comprises the abovementioned guide bolt 18, which projects from the bracket 17 on the top rail 15, and a U-shaped longitudinal guide 23 (FIGS. 2 and 3), which is arranged on the underside of the cushion shell 19 and grips over the associated bolt 18, from the end side of the latter, by way of its U-legs. Each connection 22 of the front connection pair has a hairpin-like spring 24 (FIGS. 2, 5 and 6), which is secured on the cushion support 11, that is to say on the cushion shell 19, and two latching jaws 25, 26, which are spaced apart transversely from one another in the seat framework 10 and are each provided with one of two mutually facing grooves 27, 28 for the form-fitting inversion of, in each case, one spring leg 241, 242 of the spring 24, which spreads in the direction of the latching jaws 25, 26 (FIGS. 1 and 4). In this case, a guide slope 251 or 261 is formed on each latching jaw 25, 26 above the groove 27 or 28, respectively, such that the mutually facing guide slopes 251 and 261 between the latching jaws 25, 26 form a V-shaped opening 29 into which the spring legs 241, 242 can be pressed. The two latching jaws 25, 26 of each front connection 22 are formed on a moulding 30. In each case, one moulding 30 is pushed onto the free ends of the tubular crossmember 14 which, for its part, is connected rigidly to the top rail 15 via angle plates 31. On each moulding 30, the two latching jaws 25, 26 project at right angles from a clamp-on surface 32, which serves for supporting the cushion shell 19, and the cushion shell 19 is provided with two pairs of cutouts 33, 34 for the through-passage of the total of four latching jaws 25, 26 (FIG. 4).

As can be seen in FIGS. 2 and 5, each spring 24 is secured in the cushion shell 19 in a form-fitting manner and force-fitting manner by a clamping groove 39 and a plurality of through-passages 35, 38, through which the spring 24 is guided. The transverse web 243 of the spring 24, which web connects the two spring legs 241, 242, is clipped into the clamping groove 39 and the spring legs 241, 242 run, by way of parallel leg sections, in the region of the cutouts 33, 34 on the cushion-receiving inside of the cushion shell 19. The arrangement of the grooves 27, 28 in the latching jaws 25, 26 and the formation of the cushion support 11 or of the cushion shell 19 in the region of the latching jaws 25, 26 as well as the profile of the spring legs 241, 242 are coordinated with one another such that the spring 24, which latches into the grooves 27, 28, clamps the cushion shell 19 on the clamp-on surface 32 in a force-fitting manner. In order to compensate for any possible tolerance-induced play and in order to improve the force fit, an elastic element in the form of a O-ring 40 produced from rubber is arranged between each clamp-on surface 32 and the cushion shell 19. The O-ring encloses the latching jaw 25 and, at the base of the latching jaw 25, rests on the respective clamp-on surface 32.

In order to fit the vehicle seat, the padded cushion shell 19, on which the two springs 24 are pre-fitted, is pushed, by way of its two longitudinal guides 23, onto the two bolts 18 on the top rails 15 of the seat framework 10 and, by virtue of the cushion shell 19 being pressed down at the front, the latter is clipped in the two latching-jaw pairs 25, 26 by the two springs 24. In this case, the two spring legs 241, 242 of each spring 24 are moved towards one another, counter to spring stressing, by the guide slopes 251, 261 formed on the latching jaws 25, 26 and drop, under spring force, into the grooves 27, 28, where they secure the cushion shell 19 on the seat framework 10 in a twofold manner, both by a form fit and by a force fit.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. Vehicle seat comprising:
    a longitudinally displaceable seat framework having cushion support to receive a seat cushion, and
    a rear connection and a front connection, each designed in pairs, between the cushion support and seat framework which secures the cushion support on the seat framework,
    wherein the rear connection has a horizontal guide bolt, which projects transversely on the seat framework, and a U-shaped longitudinal guide having U-legs, which is fastened on the cushion support and grips over the guide bolt, from an end side of the guide bolt, by way of its U-legs, and
    wherein the front connection comprises a hairpin-like spring, which is secured on the cushion support, and two latching jaws, which are spaced apart transversely from one another on the seat framework, each of said latching jaws having one of two mutually facing grooves for form-fitting insertion, in each case, of one spring leg of the spring with said spring spreading toward the latching jaws.

2. Seat according to claim 1, wherein each latching jaw is provided with a guide slope formed thereon above the groove such that the guide slopes are mutually facing between the latching jaws and form a V-shaped opening into which the spring legs can be pressed.

3. Seat according to claim 1, wherein the spring is secured on the cushion support in a form-fitting and force-fitting manner.

4. Seat according to claim 1, wherein an arrangement of the grooves in the latching jaws and an arrangement of the spring in grooves and through-passages of the cushion support are coordinated with one another such that the spring, which latches into the grooves, clamps the cushion support on the seat framework in a force-fitting manner.

5. Seat according to claim 4, and further comprising an elastic element arranged between the cushion support and the seat framework, wherein the spring, in a clamp-on region of the cushion support, runs, in certain sections, on an inside of the cushion support which is directed away from the seat framework.

6. Seat according to claim 5, wherein the elastic element is an O-ring which is produced from rubber and, enclosing at least one of said latching jaws, rests on the seat frame.

7. Seat according to claim 1, wherein the cushion support is defined as a cushion shell which, in a region of the front connection, has cutouts for through-passage of, in each case, one of the latching jaws.

8. Seat according to claim 1, wherein the seat framework has two top rails, each of which is guided in a displaceable manner on one bottom rail, said top rails being connected to one another by a crossmember, and wherein said latching jaws with said grooves and said guide bolt are arranged on one of the top rails.

9. Seat according to claim 8, wherein the latching jaws are arranged in the region of the crossmember which connects the top rails.

10. Seat according to claim 9, wherein the latching jaws are formed on a moulding, and wherein each moulding is pushed onto the free ends of the crossmember, which connects the two top rails.

11. Vehicle seat comprising:

a displaceable seat framework having a cushion support to receive a seat cushion, and a rear connection and a front connection, between the cushion support and seat framework, which secure the cushion support on the seat framework, wherein the rear connection has a guide bolt, projecting transversely on the seat framework, and a longitudinal guide, having legs, which is fastened on the cushion support and grips the guide bolt, from an end of the guide bolt, by way of its legs, and wherein the front connection comprises a spring, which is secured on the cushion support, and latching jaws, which are spaced apart transversely from one another, each of said latching jaws having grooves for receiving a spring leg of the spring so that said spring spreads toward the latching jaws.

12. Seat according to claim 11, wherein the latching jaws are provided with guide slopes formed thereon, above the grooves, such that the guide slopes are mutually facing and form a V-shaped opening into which the spring legs can be pressed.

13. Seat according to claim 11, wherein the spring is secured on the cushion support in a form-fitting and force-fitting manner.

14. Seat according to claim 11, wherein the grooves are arranged in the latching jaws and the spring is arranged in grooves and through-passages of the cushion support are coordinated with one another such that the spring, which latches into the grooves, clamps the cushion support on the seat framework in a force-fitting manner.

15. Seat according to claim 14, and further comprising an elastic element arranged between the cushion support and the seat framework, wherein the spring, in a clamp-on region of the cushion support, runs, in certain sections, on an inside of the cushion support which is directed away from the seat framework.

16. Seat according to claim 15, wherein the elastic element is an O-ring which is produced from rubber and, enclosing at least one of said latching jaws, rests on the seat frame.

17. Seat according to claim 11, wherein the cushion support is defined as a cushion shell which, in a region of the front connection, has cutouts for through-passage of the latching jaws.

18. Seat according to claim 11, wherein the seat framework has two top rails, each of which is guided in a displaceable manner on one bottom rail, said top rails being connected to one another by a crossmember, and said latching jaws and said guide bolt are arranged on one of said top rails.

19. Seat according to claim 18, wherein the latching jaws are arranged in the region of the crossmember which connects the top rails.

20. Seat according to claim 18, wherein the latching jaws are formed on a moulding, and wherein each moulding is pushed onto one of the free ends of the crossmember.

\* \* \* \* \*